United States Patent [19]

Lee et al.

[11] Patent Number: 4,916,271

[45] Date of Patent: Apr. 10, 1990

[54] RESISTANCE WELDING HEAD

[75] Inventors: Jack W. Lee, Brookfield; Roman T. Kowalski, Gilford; John L. Fritz, Trumbull, all of Conn.

[73] Assignee: Avco Corporation, Providence, R.I.

[21] Appl. No.: 269,966

[22] Filed: Nov. 10, 1988

[51] Int. Cl.$^4$ .................... B23K 11/06; B23K 11/30
[52] U.S. Cl. ........................................ 219/84; 219/120
[58] Field of Search ................... 219/81–84, 219/120

[56] References Cited

U.S. PATENT DOCUMENTS

| | | | |
|---|---|---|---|
| 1,196,852 | 9/1916 | Fulda | 219/84 |
| 2,280,111 | 4/1942 | Widell | 219/84 |
| 2,407,676 | 9/1946 | Munson | 219/84 |
| 2,614,146 | 10/1952 | Mallett et al. | 219/84 |
| 4,091,255 | 5/1978 | Yamamoto | 219/84 |

Primary Examiner—George H. Miller, Jr.
Attorney, Agent, or Firm—Perman & Green

[57] ABSTRACT

A welding head 10 for coupling a welding electrode 12 to a source of electrical current. The welding head includes a housing 30 and an electrically conductive shaft 18 rotatably mounted with the housing. The shaft has a substantially circular cylindrical shape having a first end surface for mounting a welding electrode thereto and a second, substantially flat, opposing end surface 20. The welding head further includes an electrical coupler in contact with the second substantially flat end surface of the shaft for coupling electrical current into the shaft. The electrical coupler includes an electrical conductor having a first end coupled to a source of welding power and an electrically conductive contact plate 22 having a substantially flat surface in contact with the second substantially flat end surface of the shaft. In one embodiment of the invention the shaft rotates against the plate upon the second end opposing surface while in another embodiment of the invention the contact plate is rigidly coupled to the shaft end. In the embodiment wherein the shaft rotates agains the contact plate an input lubricant flow coupler and an output lubricant flow orifice provide lubrication to the rotating electrical contact surface. An input cooling flow coupler and an output cooling flow coupler are also included for providing for a flow of a cooling medium for cooling the contact plate during the operation thereof.

10 Claims, 2 Drawing Sheets

RESISTANCE WELDING HEAD

FIELD OF THE INVENTION

This invention relates generally to welding apparatus and, in particular, to a welding head assembly for resistance welding having a rotating, electrically conductive shaft wherein electrical current is coupled into the shaft through a flat, relatively large area shaft end.

BACKGROUND OF THE INVENTION

Resistance seam welding is widely used for joining metallic members. For example, resistance seam welding is utilized in welding gas turbine engine recuperators. A typical recuperator may have several thousand feet of resistance welded seams. One problem which affects the quality of the overall weld is related to sporadic increases in electrical resistance at the curved rotating electrical contact surfaces inside one or both of the welding heads of the welding machine. Such sporadic increases in electrical resistance have been attributed to poor mating surface contact related to machining errors. That is, the machining of the curved electrical contact surfaces to the dimensions required for intimate contact between the curved electrical contact surfaces is difficult to achieve. Sporadic increases in electrical resistance have also been attributed to nonuniform wear of the electrical contact surfaces during the welding operation itself. Sporadic increases in electrical resistance have also been attributed to an inherent inability of the welding head to accommodate surface irregularities of the rotating electrical contact surfaces by increasing the contact pressure of these electrical contact surfaces in the welding head. That is, these rotating electrical contact surfaces do not suitably rotate if the contact pressure is increased to too great a level.

As can be appreciated, due to the difficulty in inspection of the completed complex workpiece, such as a gas turbine engine recuperator, it is important that the welding operation be performed in a manner which substantially reduces the possibility of the formation of a defective weld.

SUMMARY OF THE INVENTION

The foregoing problems are overcome and other advantages are realized by a welding head constructed and operated in accordance with the invention wherein the welding head comprises a rotating, electrically conductive shaft wherein electrical current is coupled into the shaft through a flat, relatively large area shaft end.

In accordance with the invention there is disclosed a welding head for coupling a wheel welding electrode to a source of electrical current. The welding head includes a housing and an electrically conductive shaft rotatably mounted within the housing, the shaft having a substantially circular cylindrical shape having a first end surface for mounting a welding electrode thereto and a second, substantially flat, end surface. The welding head also includes means coupled to the second substantially flat end surface of the shaft for coupling electrical current into the shaft. The invention further provides means for lubricating the rotating electrical contact surface and means for cooling the end plate contacting the second end surface of the shaft.

The coupling means includes an electrical conductor having a first end coupled to a source of welding power and an electrically conductive contact plate having a substantially flat surface in contact with the second substantially flat end surface of the shaft. The contact plate is electrically coupled to a second end of the electrical conductor. In one embodiment of the invention the shaft rotates against the plate upon the second end surface while in another embodiment of the invention the contact plate is rigidly coupled to the shaft end to completely eliminate a sporadic increase in electrical resistance within the welding head.

Welding heads have been constructed with flat rotating electrical contact surfaces and without rotating electrical contact surfaces in accordance with the teaching of this invention. Welds made using these welding heads have shown more consistent quality than those made using the welding heads with curved rotating electrical contact surfaces. Further, maintenance of these welding head has been found to be significantly more simple and less time consuming than that of conventional welding heads having curved rotating electrical contact surfaces.

BRIEF DESCRIPTION OF THE DRAWINGS

These and other aspects of the present invention will be made more apparent in the ensuing Detailed Description of the Invention read in conjunction with the accompanying Drawing wherein.

DETAILED DESCRIPTION OF THE INVENTION

Figure 1:
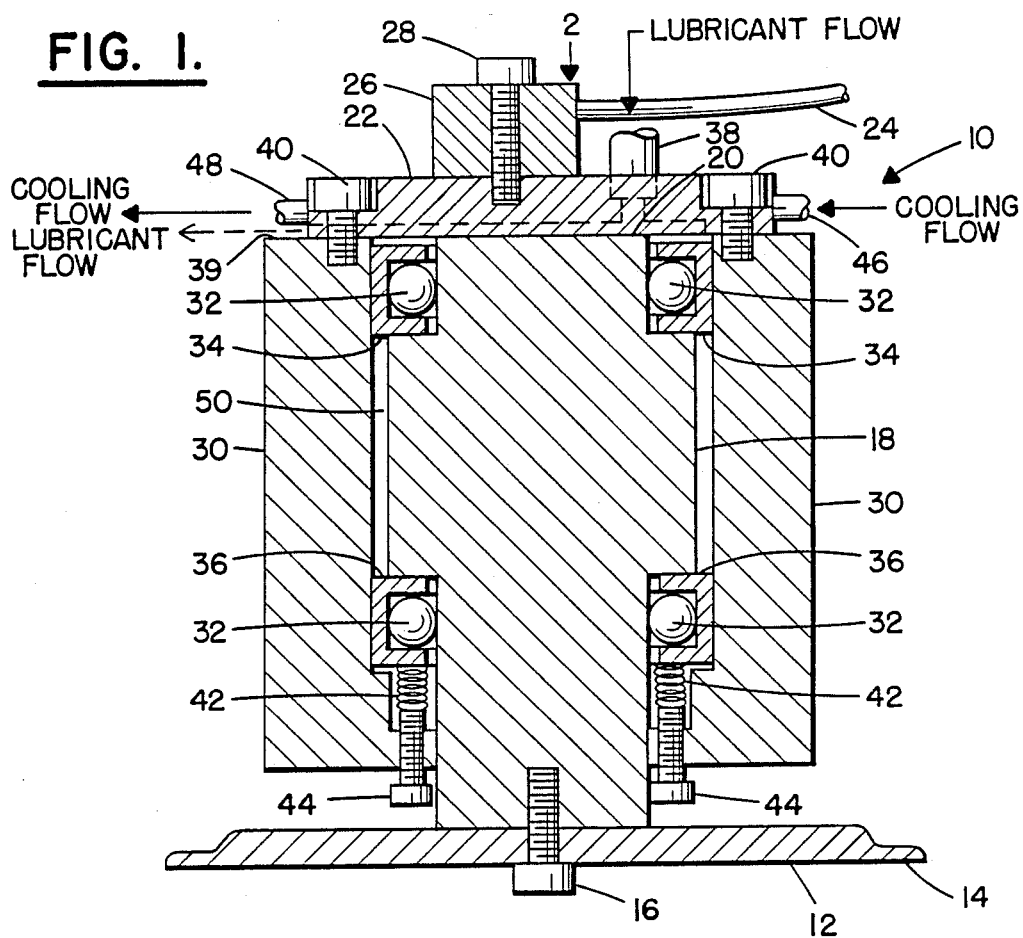
FIG. 1 is a side cut away view of a welding head constructed in accordance with the teaching of the invention.

Referring now to FIG. 1 there is shown a welding head 10 constructed in accordance with the invention. Welding head 10 comprises a circular welding electrode wheel 12 having a machined surface 14 which has a shape which is predetermined for intimately contacting one of two plates of a workpiece (not shown). Electrode wheel 12 is comprised of an electrically conductive material, such as copper. Electrode wheel 12 is provided with a centrally disposed opening for receiving a bolt 16 for affixing the wheel 12 to a substantially circular cylindrical shaft 18. Shaft 18 is also comprised of an electrically conductive material, such as copper. Electrical current is supplied to the workpiece through the electrode wheel 12 via the shaft 18. In order to couple electrical current into the shaft 18, the shaft 18 has a substantially flat contact surface 20 which is disposed at an end opposite the end to which electrode wheel 12 is affixed. Contact surface 20 is in intimate physical and electrical contact with a static contact plate 22. Static contact plate 22 is typically comprised of copper although it may comprise silver or any suitable electrically conductive material. Electrical current is supplied to static contact plate 22 by means of a conductor 24, the conductor 24 having a terminal end attached to a coupler 26 by means of a bolt 28. The opposite end of conductor 24 is coupled to an electrical source (not shown) which is operable for providing an electrical current having a magnitude sufficient for welding the workpiece. A return path to the electrical source is provided through a mating welding head (not shown). The two welding heads are identical in configuration and materials. An electrode wheel 12 is affixed to both welding heads. The heat generated by the passage of the current from the electrode wheel 12 of one welding head into the workpiece provides for the welding of the workpiece. The electrical current is passed from the electrode wheel 12 to the workpiece and then to the electrode heel 12 of the mating welding head.

Contact surface 20 or the contact surface opposite it is provided with grooves or channels for flowing a lubrication medium for lubricating these electrical contact surfaces. An input coupler 38 and an output orifice 39 are provided for supplying the lubrication medium to these electrical contact surfaces.

In order that the electrode wheel may be rotated across the workpiece surface the shaft 18 is rotatably mounted within a housing 30 by means of a plurality of ball bearings 32 which are provided in a first bearing housing 34 and a second bearing housing 36.

Contact plate 22 is fixed to the housing 30 by means of a plurality of bolts 40. The housing 30 is preferably comprised of copper while the bearings 32 and bolts 40 are comprised of steel.

In accordance with the invention there is also provided a means for controllably adjusting the contact pressure between the shaft 18 and the contact plate 22 at the contact surface 20. This means for adjusting the contact pressure is, in the illustrated embodiment, comprised of compression springs 42 having spring tension adjusting bolts 44 attached thereto. The spring tension adjusting mechanism provides for adjusting the contact pressure to accommodate wear upon the contact surface and also to readjust the contact pressure when the contact surface 20 is remachined in order to remove points of wear.

Figure 2:
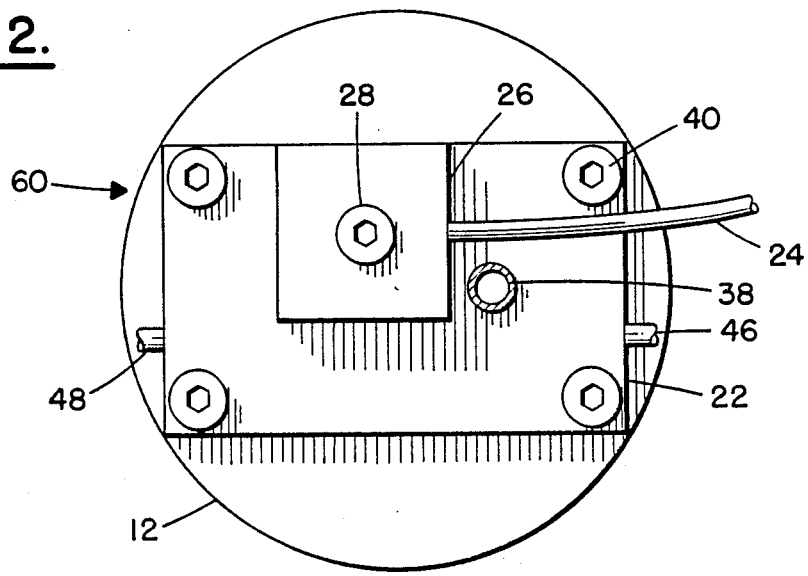
FIG. 2 is an end view of the welding head of FIG. 1.

Typical dimensions for the apparatus shown in FIGS. 1 and 2 are a housing 30 height of approximately 3.5 inches, a width of approximately 3 inches and a depth of approximately 2.5 inches. The diameter of the welding wheel 12 is approximately 3.5 inches. The maximum diameter of the shaft 18 is approximately 1.5 inch.

For some applications it may be desirable to cool the contact plate 22 during the operation thereof. The invention incorporates the internal cooling of the contact plate 22 by providing optional cooling flow inlet and outlet fittings 46 and 48, respectively.

During the welding of a workpiece the housing 30 is preferably rigidly mounted and the electrode wheel 12 is rotated by the movement of the workpiece, the workpiece typically being provided on a turntable or some other suitable means for translating the workpiece. This rotation of the electrode wheel 12 is coupled to shaft 18 which in turn rotates against the static contact plate 22 across the flat contact surface 20. Current is coupled into the shaft 18 through this relatively large and low resistance contact area, thereby achieving a significant reduction in the occurrence of defective seam welds due to sporadic increases in electrical resistance within the welding head 10.

That is, the welding head 10 of the invention substantially reduces the occurrence of sporadic increases of electrical resistance within the welding head because it includes no tangentially rotating or spring loaded electrical contact surfaces, such as brushes. The electrical contact surfaces, such as the contact surface 20, are large flat surfaces which are in intimate electrical and physical contact one with the other. In addition, such flat contact surfaces are relatively easy to machine and to maintain.

Figure 3:
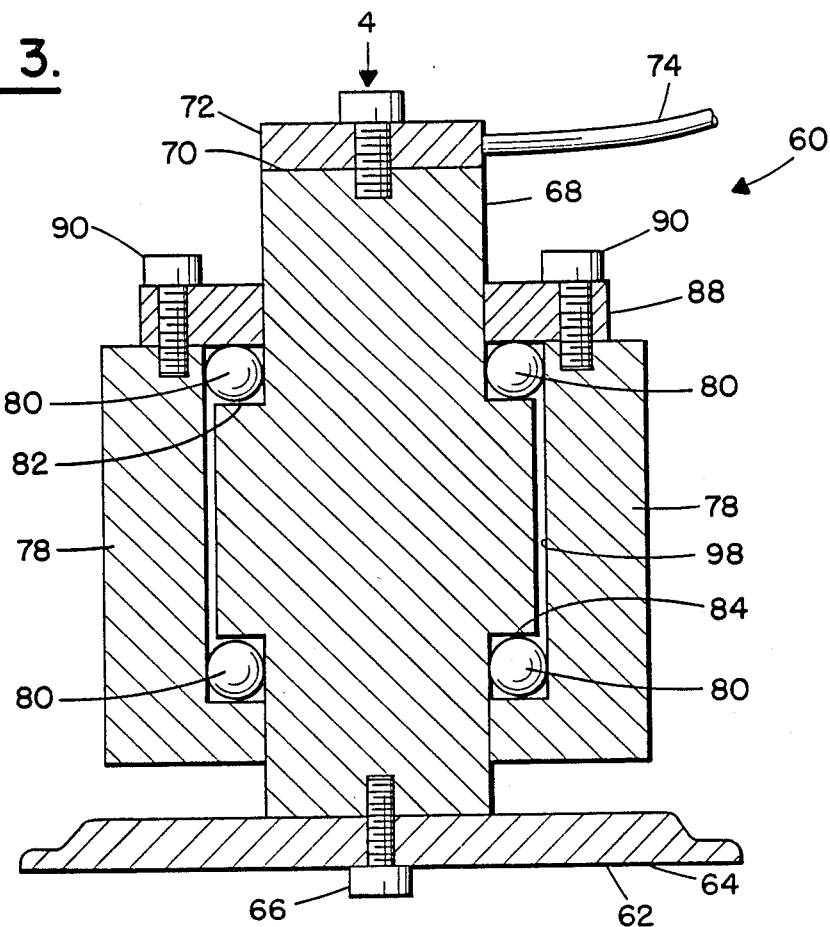
FIG. 3 is a side cut away view of another embodiment of a welding head constructed in accordance with the teaching of the invention.
Figure 4:
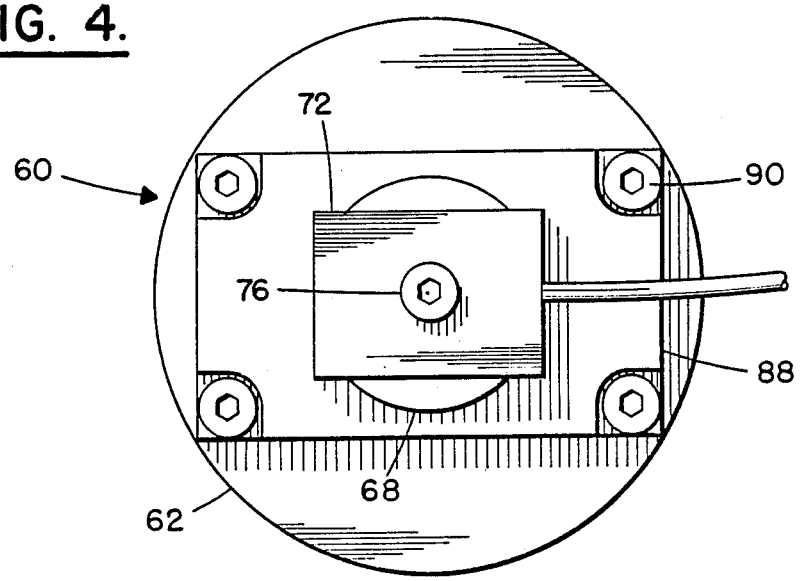
FIG. 4 is an end view of the welding head of FIG. 3.

Referring now to FIGS. 3 and 4 there is shown a welding head 60 constructed in accordance with another embodiment of the invention. Welding head 60 has coupled thereto a circular welding electrode wheel 62 having a machined surface 64 which has a shape which is predetermined for intimately contacting one of the two plates of a workpiece (not shown). It should be appreciated that the welding electrode 62 does not form a part of the welding head 60 per se but is shown coupled thereto to facilitate an understanding of the invention. Electrode wheel 62 is comprised of an electrically conductive material, such as copper. Electrode wheel 62 is provided with a centrally disposed opening for receiving a bolt 66 for affixing the wheel 62 to a substantially circular cylindrical shaft 68. Shaft 68 is also comprised of an electrically conductive material, such as copper. Electrical current is supplied to the workpiece through the electrode wheel 62 via the shaft 68. In order to couple electrical current into the shaft 68, the shaft 68 has a flat contact surface 70 which is disposed at an end opposite to the end to which electrode wheel 62 is affixed. Contact surface 70 is in intimate physical and electrical contact with an electrical coupler 72. Electrical current is supplied to coupler 72 by means of a flexible conductor 74, the conductor 74 having a terminal end attached to the end 70 of shaft 68 by means of a bolt 76. The opposite end of conductor 74 is coupled to an electrical source (not shown) which is operable for providing an electrical current having a magnitude sufficient for welding the workpiece. A return path to the electrical source is provided through the mating welding head. The two welding heads are identical in configuration and materials. An electrode wheel 62 is affixed to both welding heads. The heat generated by the passage of the current from the electrode wheel 62 of the welding heads into the workpiece provides for the welding of the workpiece. The electrical current is passed from the electrode wheel 62 to the workpiece and then to the electrode wheel 62 of the mating welding head.

In order that the electrode wheel may be rotated the shaft 68 is rotatably mounted within a housing 78 by means of a plurality of ball bearings 80 which are typically provided within bearing housings (not shown). As can be seen the shaft 68 has a centrally disposed portion which has a larger diameter than the two terminal ends of the shaft 68, thereby forming two shoulder regions 82 and 84. An end plate 88 is removably coupled to housing 78 by a plurality of bolts 90. Plate 88 has a centrally disposed opening 92 through which the rotating shaft 68 passes.

It can be seen that the embodiment of the invention shown in FIGS. 3 and 4 completely eliminates any moving electrical contact surface in that the flexible conductor 74 is coupled directly to the shaft 68 via the coupler 72. This eliminates the undesirable sporadic increases in electrical resistance associated with a welding head with rotating electrical contact surfaces. During the welding operation it is advantageous to rotate the electrode wheel 62 in a first direction, such as clockwise, for welding a first seam, and then to weld a second seam in the opposite direction in order to prevent excessive twisting of the conductor 74. In this regard it should be noted that the electrode wheel 12 of the embodiment of FIGS. 1 and 2 may be rotated in one direction indefinitely in that electrical contact is made through the rotating flat surface region defined by contact surface 20 and contact plate 22.

It should be realized that presently preferred embodiments of the invention have been described above and that the invention is not intended to be limited to only these presently preferred embodiments. Furthermore, the invention should not be construed to be limited to the materials and/or dimensions disclosed above. The invention is instead meant to be limited only as the invention is defined in the appended claims.

What is claimed is:

1. A welding head for coupling a welding electrode to a source of electrical current, comprising:
    a housing; an electrically conductive shaft means rotatably mounted within said housing, said shaft means having a first end surface for mounting a welding electrode thereto and a second, opposing, substantially planar end contact surface; and
    electrically conductive contact plate means rigidly coupled to said housing and having a substantially planar contact surface compressively coupled to said contact surface of said shaft means such that, during a rotation of said shaft means, said contact plate means remains stationary while said contact surface of said shaft means rotates upon said contact surface of said contact plate means, and wherein at least one of said contact surfaces is provided with a channel or channels for flowing a lubricant therethrough.

2. A welding head as described in claim 1 and further comprising spring means for urging said contact surface of said shaft means against said contact surface of said contact plate means.

3. A welding head as defined in claim 2 wherein said spring means include means for adjusting an amount of force exerted by said spring means, said spring means being mounted relative to said contact plate means such that said shaft means is positioned between said spring means and said contact plate means.

4. A welding head as defined in claim 1 and further comprising a plurality of bearings interposed between said shaft means and said housing for rotatably coupling said shaft means to said housing.

5. A welding head as defined in claim 1 wherein said contact plate means includes internal passages coupled to an input cooling flow coupler and an output cooling flow coupler for providing for a flow of a cooling medium for cooling said contact plate means during the operation thereof.

6. A welding head as defined in claim 1 wherein said contact plate means comprises an input lubricant flow coupler and an output lubricant flow orifice for supplying a lubricating medium for lubricating the rotating electrical contact surface of said shaft means.

7. A welding head for coupling a welding electrode to a source of electrical current, comprising:
    a housing;
    an electrically conductive shaft rotatably mounted within said housing, said shaft having a substantially circular cylindrical shape having a first end surface for mounting a welding electrode thereto and a second, substantially flat, end contact surface; and
    contact plate means mounted upon an end of said housing, said contact plate means being electrically coupled to a source of welding power and having a substantially flat contact surface compressably coupled to said contact surface of said shaft for coupling electrical current into said shaft, said contact surface of said shaft bearing against and rotating upon said contact surface, wherein at least one of said contact surfaces is provided with a channel or channels for flowing a lubricant medium therein, and wherein said contact plate means is coupled to an input lubricant flow coupler and an output lubricant flow orifice for supplying a lubricating medium to the channel or channels for lubricating the rotating electrical contact surface of said shaft.

8. A welding head as defined in claim 7 and further comprising a plurality of bearings interposed between said shaft and said housing for rotatably coupling said shaft to said housing.

9. A welding head as described in claim 7 and further comprising spring means for urging said second substantially flat end surface of said shaft against said substantially flat surface of said contact plate means.

10. A welding head as defined in claim 7 wherein said contact plate means comprises an input cooling flow coupler and an output cooling flow coupler for providing a flow of a cooling medium for cooling said contact plate means during the operation thereof.

* * * * *